United States Patent Office 3,203,771
Patented Aug. 31, 1965

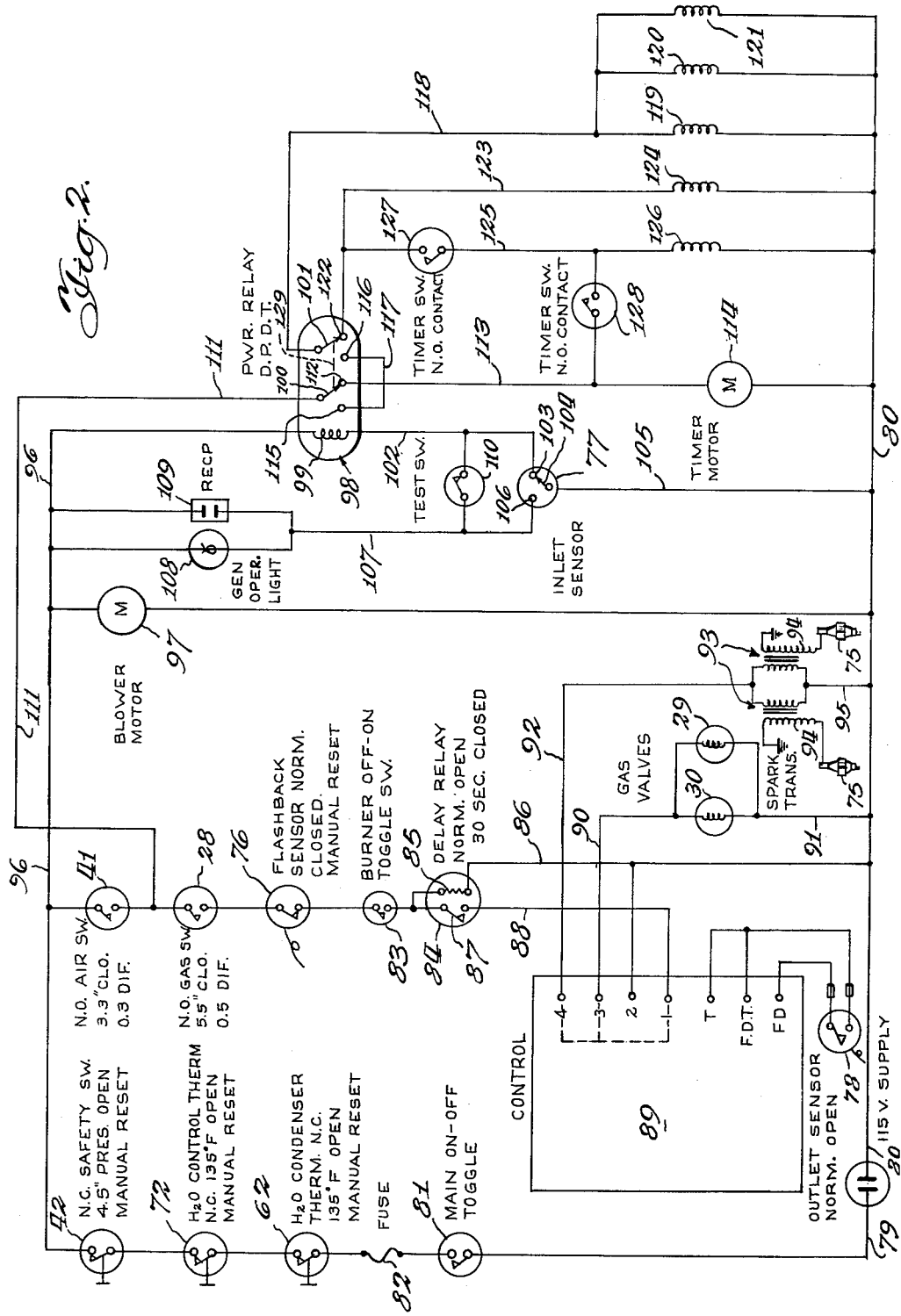

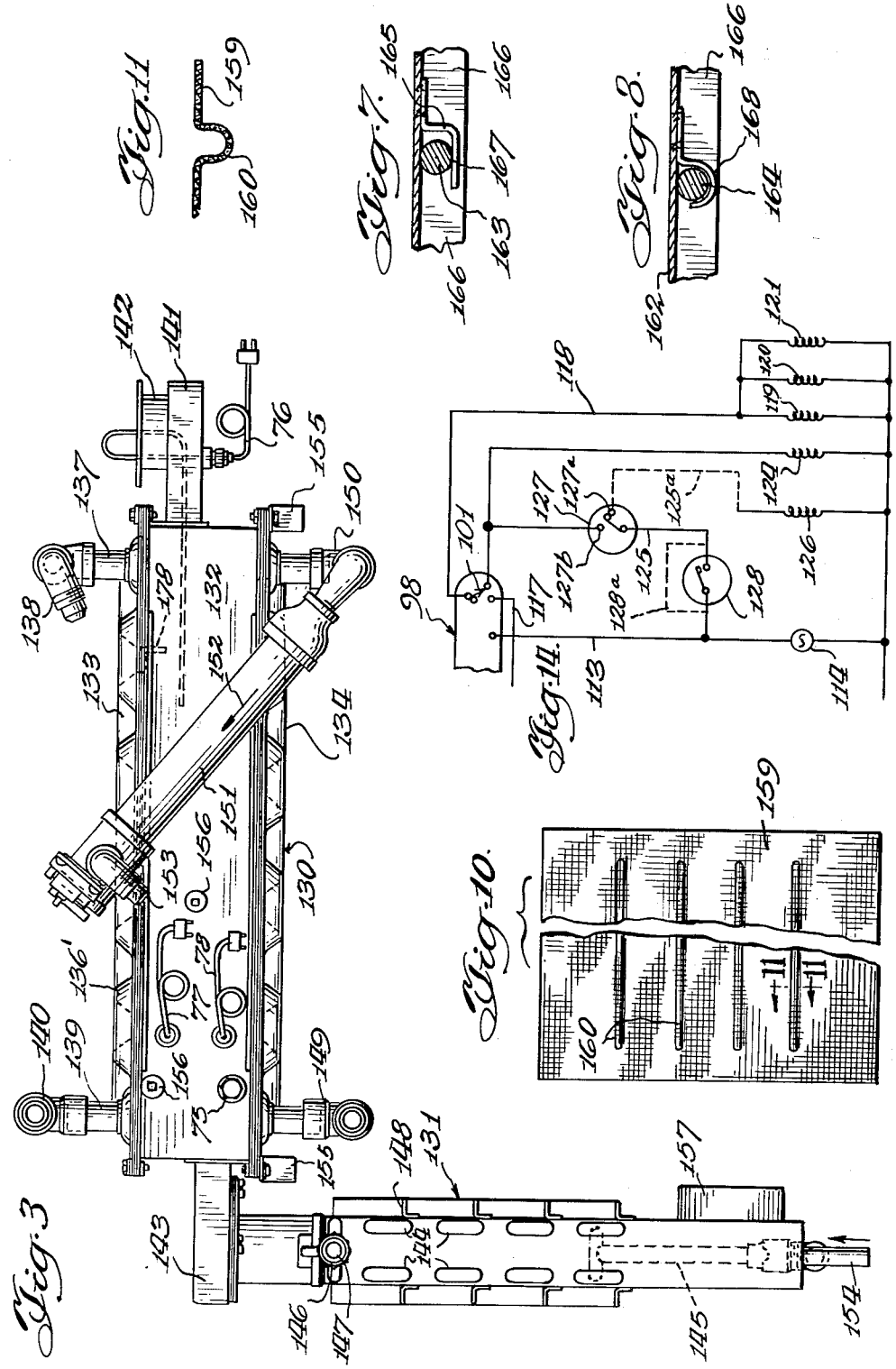

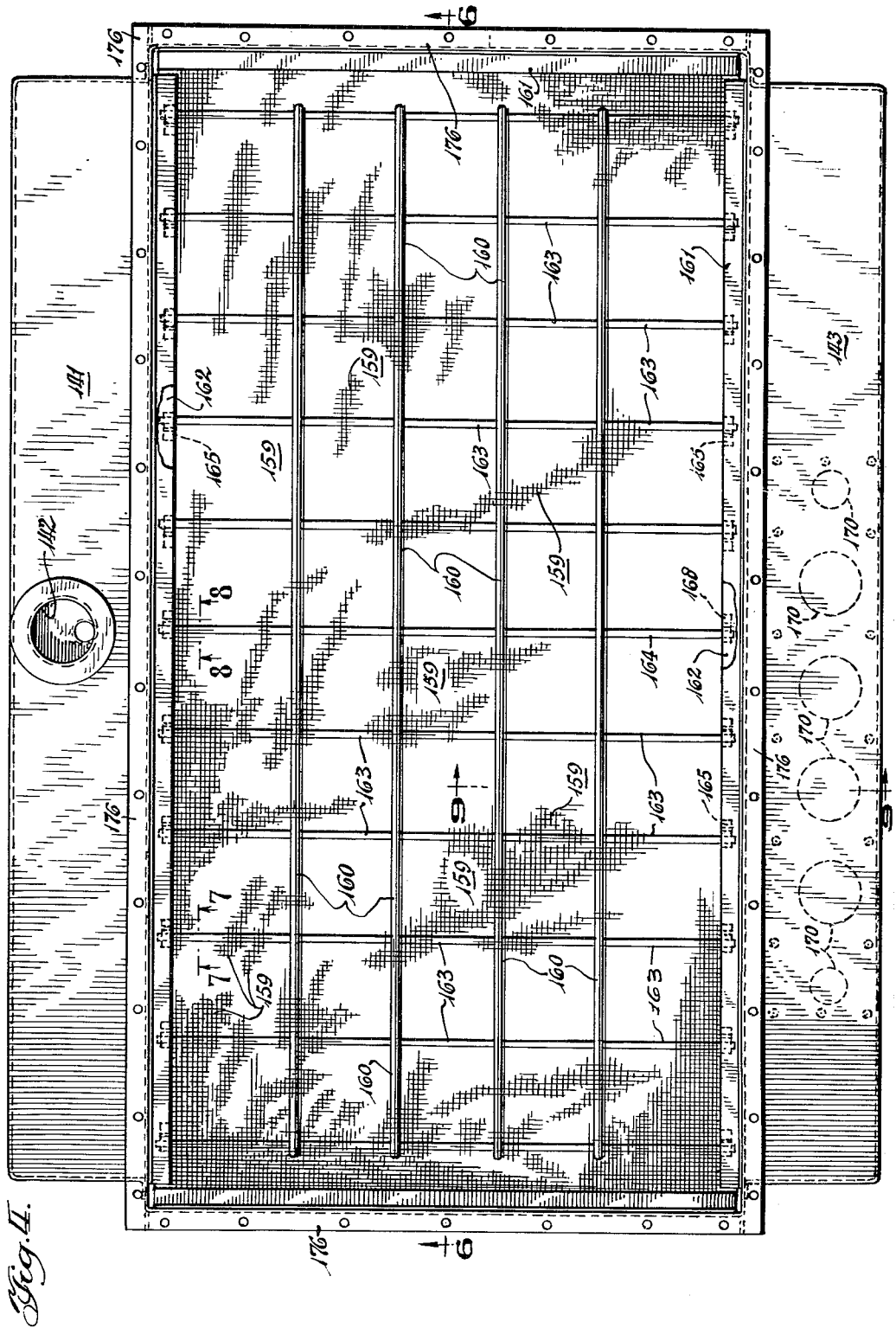

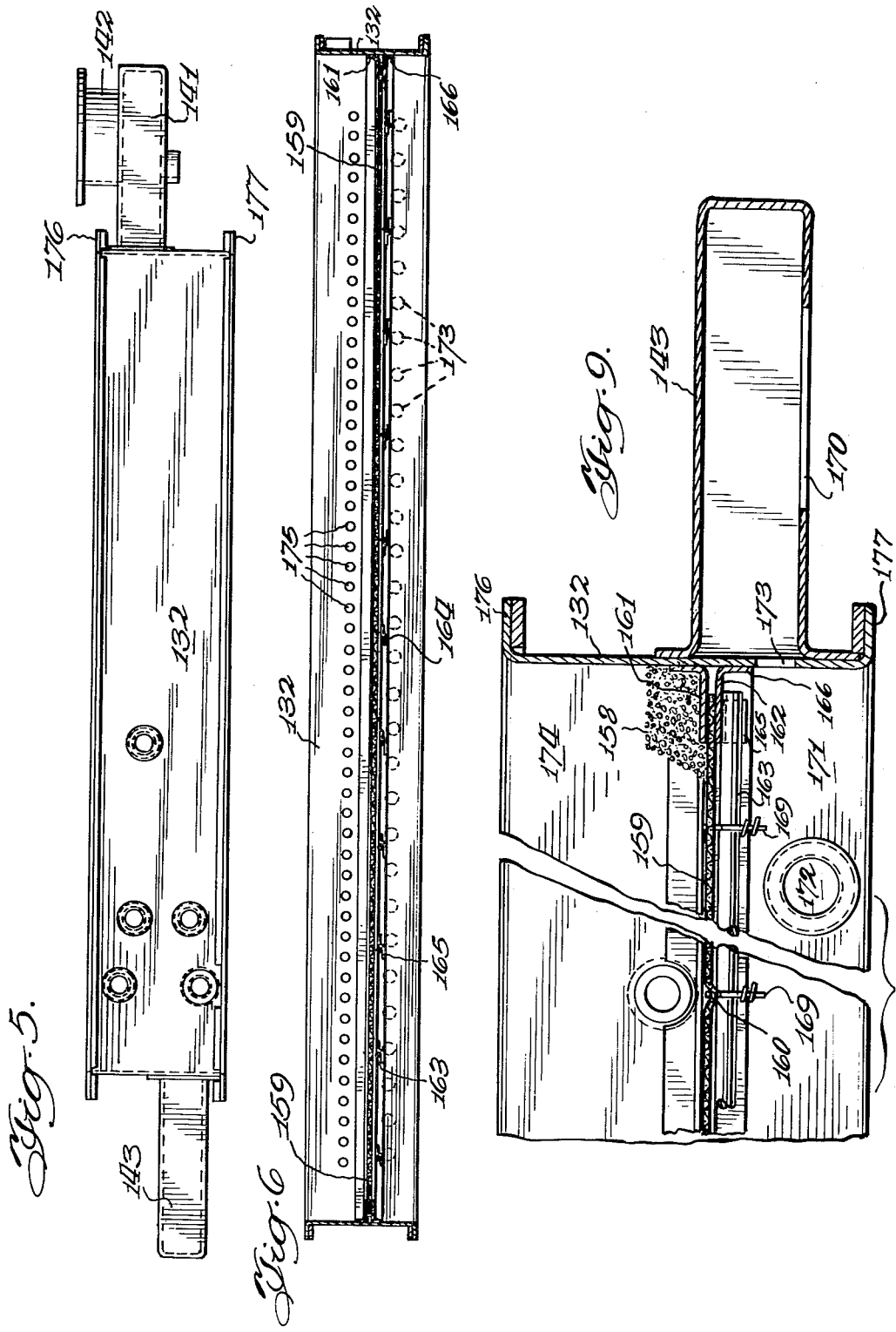

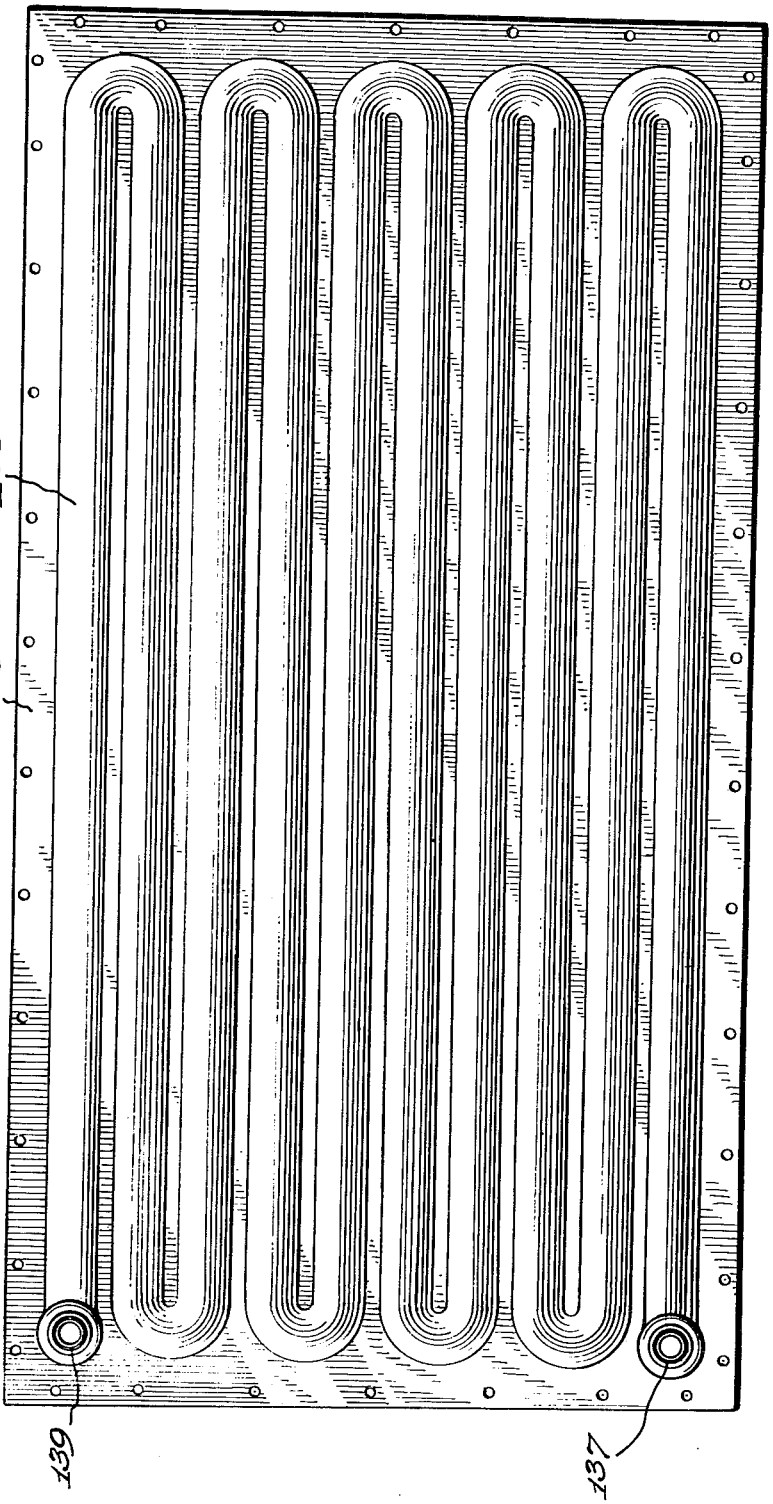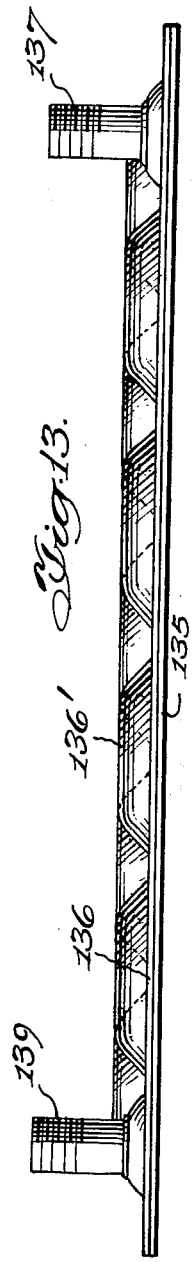

3,203,771
APPARATUS FOR CONTROLLING CARBON DIOXIDE CONTENT OF AN ATMOSPHERE
Joshua R. C. Brown, Chesterton, Ind., and Jess W. Thomas, St. Joseph, Mich., assignors to Whirlpool Corporation, a corporation of Delaware
Filed July 30, 1962, Ser. No. 213,520
6 Claims. (Cl. 23—281)

This invention relates to an apparatus for producing an atmosphere suitable for preserving or conditioning food and the like particularly for long periods of time and particularly to an apparatus for controlling or regulating the carbon dioxide content of a controlled storage atmosphere.

As is explained in the copending application of K. Bedrosian and J. R. C. Brown, Serial No. 149,731, filed November 2, 1961, now abandoned after filing continuation-in-part Patents 3,102,778 and 3,102,780, issued September 3, 1963, and assigned to a common assignee, stored animal and vegetable products such as food products immediately begin to deteriorate. As is well known, this deterioration can be markedly slowed if these products are refrigerated. The deterioration on storage can be remarkably further delayed if the products are stored in a controlled atmosphere containing a reduced amount of oxygen such as from 2–10%, not more than about 13% carbon dioxide and the remainder inert gases. It is also necessary that harmful gases such as oxides of nitrogen be substantially absent as these tend to deteriorate the products.

This copending application also discloses an apparatus and method for generating such an atmosphere by the catalytic combustion of a gaseous hydrocarbon fuel in the presence of air and at a temperature sufficiently low that the production of substantial amounts of oxides of nitrogen is avoided. As is explained here, the combustion is maintained at a temperature not greater than about 2000° F. in order to produce such an atmosphere. The combustion reduces the amount of oxygen and the amount of carbon dioxide is controlled by providing means for removing carbon dioxide when necessary.

The invention here is particularly concerned with an apparatus for controlling the carbon dioxide content of an atmosphere suitable for food preservation and conditioning and the like.

One of the features of this invention therefore is to provide such an improved apparatus for controlling the preserving atmosphere in which the carbon dioxide content may be closely regulated as desired.

Other features and advantages of the invention will be apparent from the following description of certain embodiments of the invention taken in conjunction with the accompanying drawings. Of the drawings:

FIGURE 2 is a semi-diagrammatic view of a wiring diagram for the apparatus or system of FIGURE 1.

FIGURE 3 is a side elevational view of a second embodiment of a catalytic burner and associated condenser for generating the controller preserving atmosphere.

FIGURE 4 is a plan view of the burner with the upper closure member removed and with the supporting rods which are beneath the screen shown in solid lines.

FIGURE 5 is a side elevational view of the enclosing frame and associated headers of the burner.

FIGURE 6 is a sectional view taken substantially along line 6—6 of FIGURE 4 and with a set of lower openings shown in phantom.

FIGURE 7 is an enlarged vertical sectional view taken substantially along line 7—7 of FIGURE 4.

FIGURE 8 is an enlarged vertical sectional view taken substantially along line 8—8 of FIGURE 4.

FIGURE 9 is an enlarged vertical sectional view taken substantially along line 9—9 of FIGURE 4.

FIGURE 10 is a reduced plan view of the supporting screen of FIGURE 4.

FIGURE 11 is an enlarged sectional view taken substantially along line 11—11 of FIGURE 10.

FIGURE 12 is a plan view of the top closure member of the catalytic burner.

FIGURE 13 is a side elevational view of the member of FIGURE 12.

FIGURE 14 is a portion of the semi-diagrammatic wiring diagram of FIGURE 2, with certain modifications thereto.

Figure 1:
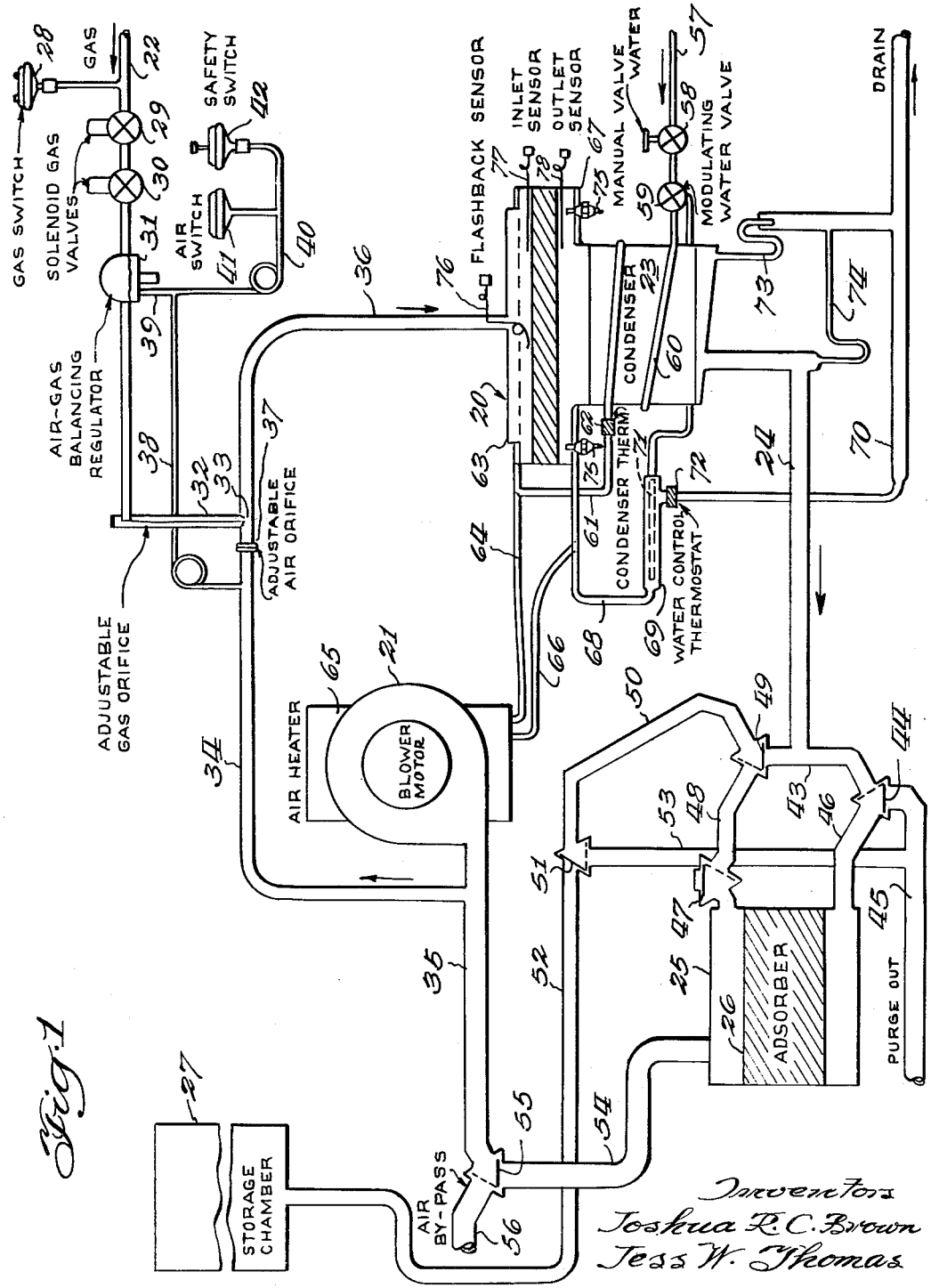
FIGURE 1 is a semi-diagrammatic view of an apparatus embodying the invention.

The accompanying drawings disclose, in part semi-diagrammatically, a system or apparatus for generating an atmosphere with controlled amounts of carbon dioxide, oxygen and inert gases and eliminating any substantial amounts of gases such as oxides of nitrogen that would be harmful to the products being stored. For an easier understanding of the invention FIGURES 1 and 2 present the elements of the apparatus and the controls semi-diagrammatically as the elements are associated with each other. The remaining figures of the accompanying drawings disclose in greater detail alternate embodiments of certain of these elements.

FIGURE 1 discloses an atmosphere generating system which includes a catalytic burner 20 supplied with air by a blower 21 and with hydrocarbon gas by a gas line 22. The products of combustion from the burner 20 flow through a condenser 23 connected to the burner for cooling and for removal of moisture from the gaseous combustion products. The condenser 23 is connected by means of a pipe 24 to an adsorber chamber 25 in which is located an adsorber bed 26 that is preferably activated carbon for removing carbon dioxide from gases by selective and reversible adsorption. The adsorber chamber 25 may be connected as desired and as described in greater detail hereinafter with a storage chamber 27 shown diagrammatically in FIGURE 1 in which food products may be stored for long periods of time.

Connected to the gas supply line 22 is a gas switch 28 and the flow of gas through the line 22 is controlled by a pair of solenoid operated gas valves 29 and 30 arranged in series. Gas from the line 22 also flows through an air-gas balancing regulator 31 and through a gas line 32 containing an adjustable gear orifice 33 for regulating the gas supply.

Air is supplied by means of a pipe 34 which connects to a main air pipe 35 leading from the motor operated air blower 21. The air pipe 34 and the gas line 32 join at the region of the gas orifice 33 for flow through an air-gas mixing line 36 into the catalytic burner 20. The air flow through the pipe 34 and thus into the line 36 is controlled by an adjustable air orifice 37.

A smaller air line 38 leads from the air pipe 34 in front of the adjustable orifice 37. One branch 39 of this air line 38 goes to the balancing regulator 31 and another branch 40 connects with an air switch 41 and safety switch 42.

The pipe 24 that conveys the products of combustion from the burner 20 is connected to a pipe 43 which has one end connected by means of a two-way valve 44 to a purge outlet pipe 45 and to a pipe 46 leading to the adsorber chamber 25 on one side of the adsorber bed 26. The opposite side of the adsorber chamber 25 is connected by way of a valve 47 to a pipe 48 which is connected by way of a two-way valve 49 to the above-mentioned pipe 43 and to a pipe 50 which connects by way of a two-way valve 51 to a pipe 52 leading to the storage chamber 27 and a pipe 53 which connects to the purge outlet pipe 45. Also connected to the adsorber chamber 25 on the same side thereof as the valve 47 is a pipe 54 which is connected by way of a two-way valve 55 to a by-pass pipe 56 and to the outlet of the air pipe 35 from the blower 21.

The valves 44, 47, 49, 51 and 55 each function in two positions to control the flow of air and generated atmosphere. In each valve the energized position is shown in a broken line and the de-energized position in a solid line. Thus, as is shown in FIGURE 1, de-energized valve 44 blocks the outlet into pipe 45. De-energized valve 47 opens pipe 48 to the top of the adsorber chamber 25. De-energized valve 49 blocks entry to both pipes 48 and 50 from pipe 43. De-energized valve 51 blocks access to pipe 52 and thus to chamber 27 from pipe 50. De-energized valve 55 blocks access to pipe 54 from pipes 35 and 56. When each of these valves is energized the dotted line position is assumed and the pipe connections are obvious.

For various cooling purposes including maintaining the temperature in the catalytic burner 20 sufficiently low as to prevent substantial oxidation of nitrogen in the air during combustion, and for heating air from blower 21, as required, by using the heat from the water after it has been heated by cooling the burner, there is provided cooling water through a water line 57. This water line is provides with an manual valve 58 and a modulating control valve 59. The water line 57 beyond the valves 58 and 59 connects to the cooling water passage 60 of the condenser 23. From here a water line 61 which is provided with a condenser thermostat 62 connects to the top closure member 63 containing cooling passages as described in greater detail hereinafter. From this top closure member 63 a water line 64 passes to an air heater 65 in which air delivered by a blower 21 is heated by the heat of water from the pipe 64, as may be required. An air heater outlet pipe 66 leads to the coolant passages of a bottom closure member 67 on the burner 20. From the bottom closure member 67 an outlet pipe 68 leads through an enlarged pipe section 69 to a drain pipe 70. Located in this enlarged section 69 is the feeler portion 71 of the thermostat which controls the modulating water valve 59. Thus the volume flow of the cooling medium or water is controlled in direct relationship to the temperature of the cooling medium leaving the apparatus. Located in the drain pipe 70 is a water control thermostat 72. The drain pipe 70 not only carries away the cooling water from the burner and condenser but also carries away condensate from the condenser 23 by way of a trap pipe 73 and a second trap pipe 74.

In order to initiate ignition, the bottom of the catalytic burner is provided with a pair of spark plugs 75. Among the controls for the burner are a flashback sensor 76 that communicates with the top of the burner 20 and the outlet of air-gas mixing line 36, an inlet sensor 77 also communicating with the top of the burner and an outlet sensor 78 communicating with the bottom of the burner.

FIGURE 2 illustrates the wiring diagram of the atmosphere generating system of FIGURE 1 and includes some controls and switches that are not shown in FIGURE 1.

The power supply to the system is the conventional 115 volt 60 cycle alternating current supplied through lines 79 and 80. In line 79 there are connected in series a main on-off toggle control switch 81, fuse 82, condenser thermostat 62, water control thermostat 72 and safety switch 42. The condenser thermostat 62 is normally closed and is adjusted to open at a predetermined temperature such as 135° F. in order to interrupt the circuit when water leaving the condenser is in excess of this temperature. Water control thermostat 72 is a normally closed thermostat set to open at a predetermined temperature such as 135° F. This thermostat opens when water leaving the burner exceeds this preset temperature. Safety switch 42 is normally closed at an air pressure less than a predetermined maximum, such as 4.5 inches of water, and will open at higher pressures to interrupt the circuit. This switch provides protection against excessively high pressures in air line 34 and especially against a defective diaphragm (not shown) in the balancing regulator 31. Each of switches 62, 72 and 42 is a manually reset switch.

Also connected in series with the previously mentioned series of switches 81, 62, 72 and 42 are air switch 41, gas switch 28, flashback sensor switch 76 and on-off switch 83 for the burner. Air switch 41 is normally open but closes when the blower 21 develops sufficient pressure to apply a predetermined minimum such as 3.3 inches of water to the air switch 41. Gas switch 28 is normally open but closes at a predetermined minimum pressure such as 5.5 inches of water in the gas supply line 22. The flashback sensor switch 76 is normally closed with its sensor mounted just above the catalyst bed within the burner 20 as explained later and is set to open at a predetermined excessive temperature such as 800° F.

The side of burner switch 83 opposite switch 76 is connected to a delay relay 84. Within this relay 84 is an electric resistance heater 85 which is connected by wire 86 to A.C. line 80. Also within the delay relay 84 is a normally open switch 87 which is connected by wire 88 to a terminal on a conventional control 89. Outlet sensor thermostat switch 78 is also connected to the control 89 and has its bulb or feeler located directly beneath the catalyst bed in burner 20 as illustrated diagrammatically in FIGURE 1.

As can be seen in FIGURE 2, control 89 has terminals marked 1, 2, 3 and 4 in a set and a second set of terminals marked T, FD–T and FD. The switch 78 which is normally open is connected between the terminals FD and FD–T. The terminal T is connected to terminal FD–T.

Control 89 is a standard ignition control system for oil or gas burners that are readily available commercially. It functions to connect terminal 1 to terminals 3 and 4, as illustrated by the broken lines in FIGURE 2, for a predetermined period of time. Upon the expiration of the predetermined period, terminal 1 will automatically be disconnected from terminals 3 and 4 unless switch 78 has closed. If switch 78 closes before the expiration of the predetermined time interval, terminal 1 is disconnected from terminal 4 but remains connected to terminal 3.

Connected from terminal 3 of the control 89 are the two gas valves 29 and 30 by way of a line 90. The two gas valves 29 and 30 have operating solenoids, as illustrated, connected in parallel. The other sides of the solenoids of the valves 29 and 30 are connected by wire 91 to the A.C. supply line 80.

From terminal 4 of control 89 there is connected by wire 92 a pair of transformers 93 having secondary windings 94 each of which has one side grounded, as indicated, and the other side connected to a spark plug 75. The wire 92 connects to one side of the primary windings of the transformers and the other side is connected by wire 95 to the A.C. line 80.

Also connected between the line 80 and wire 96 which connects switches 41 and 42 is a motor 97 of the blower 21.

Also connected to wire 96 is a power relay 98 which includes an operating coil 99 and a pair of ganged switches 100 and 101 connected together by a linkage 129. The other side of coil 99 is connected by means of wire 102 to the cold terminal 103 of inlet sensor 77. This sensor includes in addition to the cold terminal 103, a hot terminal 106 and a movable switch 104 connected by wire 105 to A.C. line 80. The feeler or temperature sensitive portion of the inlet sensor 77 is mounted just above the catalyst bed in burner 20 and switch 104 moves from the cold terminal 103 to the hot terminal 106 at a predetermined temperature such as about 800° F. Connected from the hot terminal 106 by way of wire 107 is a signal light 108 and a signal receptacle 109. These are in parallel and are connected to wire 96. A test switch 110 is also connected between the wires 102 and 107. The test switch 110 is used in the customary way to test the equipment when desired. The signal receptacle 109 may be used to connect a remote signal device as required.

Switch 100 within the power relay 98 is connected by wire 111 to the connection between air switch 41 and gas switch 28. The normally closed terminal 112 of switch 100 is connected by wire 113 to timer motor 114 the other side of which is connected to A.C. line 80. The normally open terminal 115 of switch 100 is connected to the normally open terminal 116 of switch 101 by a wire 117.

The fixed end of switch 101 is connected by way of wire 118 to the operating solenoid 119 of valve 49, solenoid 120 of valve 44 and solenoid 121 of valve 47. These solenoids are in parallel and their other ends are connected to A.C. line 80. The normally closed terminal 122 of switch 101 is connected by way of line 123 to the solenoid 124 of valve 55. Terminal 122 is also connected by way of a normally open timer switch 127 and wire 125 to the solenoid 126 of valve 51. The solenoids 124 and 126 also have their opposite sides connected to A.C. line 80. A second normally open timer switch 128 is connected from the wire 113 to wire 125 between timer switch 127 and solenoid 126. Timer switches 127 and 128 are operated at predetermined times by the energization of timer motor 114.

The operation of the apparatus as illustrated in FIGURES 1 and 2 is as follows: When gas is supplied at sufficient pressure in line 22 and water at sufficient pressure and temperature in line 57, the apparatus may be energized by closing the main switch at 81. Power is then supplied by way of line 79 through closed switch 81, fuse 82, closed water condenser thermostat switch 62, closed water control switch 72 and closed safety switch 42. This therefore connects power from line 79 to one side of the air switch 41 and to the blower motor 97 and the coil 99 of power relay 98 by way of line 96. The power relay 98 is immediately energized-causing switches 100 and 101 to move to the left by reason of their common linkage 129 thereby contacting the switches 100 and 101 with fixed terminals 115 and 116, respectively. This is the normally open position of the switches and these two contacts are connected by a wire 117. The blower 21 operated by the motor 97 begins to run to supply air by way of pipes 35 and 34 to the burner 20. As soon as the air pressure reaches a minimum such as 3.3 inches of water it is sensed by air switch 41 and the switch thereupon closes. This supplies power by way of wire 111, switch 100, wire 117, switch 101 and wire 118 to solenoids 119 of valve 49, 120 of valve 44 and 121 of valve 47 to line 80, thereby operating these valves. This moves the operating portions of the valves to the dotted line positions of FIGURE 1. As solenoid 124 of valve 55 remains de-energized it is in the solid line position of FIGURE 1. The valve 51 is similarly de-energized so that it is in the solid line position. With this arrangement the gases coming from the burner 20 flow through the pipes 24, and 43, valve 49, pipe 50, valve 51 and pipe 53 into the purge outlet line 45. They thus by-pass the adsorber 25 and are blocked from entering the storage chamber 27 by valve 51.

During this supply of power, power is also provided to the gas switch 28 which is closed so long as there is a minimum gas pressure, for example at least 5.5 inches of water pressure. Since the burner has not yet been fired, the flashback sensor 76 is closed and then as long as the burner toggle switch 83 is manually closed power is delivered to the heater 85 of delay relay 84. After a predetermined time interval, such as 30 seconds in the present embodiment, switch 87 closes and thereby supplies power through wire 88 to terminal 1 of control 89. Since the outlet sensor 78 likewise has not yet sensed any temperature rise in the burner, terminal 1 is connected to terminals 3 and 4 of the control, as indicated in FIGURE 2. This serves to power the solenoids of gas valves 29 and 30 and to open these valves to supply gas to the burner. The power connection through terminal 4 of control 89 also energizes the two spark plugs 75 through the transformers 93. As soon as the sparks are produced in the lower portion of the burner 20 ignition of the gas takes place. Because of the action of the catalyst in the burner burning thereupon moves into the catalyst bed described in more detail hereinafter.

As soon as the outlet sensor 78 senses a predetermined minimum temperature, about 700° F. in the present embodiment, it closes thereby causing control 89 to disconnect terminal 1 from terminal 4 only, opening the circuit to the transformers 93 and thus stopping the operation of the spark plugs 75. In this embodiment, this takes less than 45 seconds. Control 89 which is a conventional commercial control is preset so that if the outlet sensor switch 78 does not close in approximately 45 seconds terminal 1 will be disconnected from both terminals 3 and 4, shutting off not only the ignition circuit but also the gas supply by de-energizing gas valves 29 and 30.

Gas continues to burn catalytically within burner 20 with the products of combustion passing to the purge outlet 45 by way of valves 49 and 51 in the manner previously described. After about 15 minutes warm-up time, the inlet sensor 77 reaches a predetermined temperature, here exemplified as 800° F. This is the temperature above the catalyst bed of burner 20 and signifies a normal operation. As soon as this temperature has been reached the switch 104 moves from the cold terminal 103 to contact the hot terminal 106. This disconnects the operating coil 99 of the power relay 98 and turns on the signal light 108 to show that the burner is operating.

This de-energizing of the power relay 98 causes switches 100 and 101 to move back to their normally closed positions as shown in FIGURE 2. This provides power to the timer motor 114 by way of terminal 112. The timer switch 128 controlled by the timer motor 114 is preset to be closed at this instant so that solenoid 126 of valve 51 is energized to move it to the dotted line position of FIGURE 1. In the meantime solenoids 119, 120 and 121 had been de-energized when power relay switch 101 moved back to its terminal 122 as previously described. Under these conditions, here identified as condition A, the products of combustion from the exit pipe 24 flow through the lower end of pipe 43 of valve 44 and pipe 46 into the bottom of adsorber chamber 25. From here, they flow up through the adsorber bed 26 where carbon dioxide is adsorbed and the gases then flow by way of valve 47, pipe 48, valve 49, pipe 50, valve 51 and pipe 52 into the storage chamber 27. The timer is so constructed that this condition prevails for a predetermined period of time, for example 21 minutes.

After the 21 minutes of this condition A timer switch 127 is closed and this energizes solenoids 124, 119, 120 and 121 of valves 55, 49, 44 and 47, respectively, with solenoid 126 of valve 51 remaining energized. As all valves are energized they are moved to the dotted line positions of FIGURE 1. This is identified here as condition B.

Under condition B the products of combustion from the burner 20 and condenser 23 pass through the pipe 24, pipe 43, valve 49, pipe 50, valve 51 and pipe 52 to the storage chamber 27. At the same time heated air from the blower 21 passes by way of pipe 35, valve 55 and pipe 54 through the adsorber bed 26 and out pipe 46, valve 44 and purge outlet pipe 45. This condition which lasts for a predetermined time, here exemplified as 3 minutes, removes adsorbed carbon dioxide from the adsorber bed.

At the end of condition B timer control switch 128 then opens and this de-energizes all five of the valves so that they all move to the solid line positions of FIGURE 1. This condition, here identified as condition C, lasts approximately 3 minutes during which the products of combustion pass by way of the pipe 24, pipe 43, valve 44 and pipe 46 through the adsorber bed 26 and by way of valve 47, pipe 48, valve 49, pipe 50, valve 51 and pipe 53 to the purge outlet pipe 45. This causes the products of combustion to sweep the adsorber bed 26 clear of air which collected in the bed and the connecting pipes during the previous regeneration cycle (condition B). During this 3 minute period of purge (condition C) timer switch 127 is also opened by the timer.

At the end of the 3 minute purge (condition C), the timer again has advanced to close timer switch 128 to again energize solenoid 126 of valve 51 and condition A is initiated again. The successive conditions A, B and C constitute a single cycle and the cycles are repeated continuously to supply the desired atmosphere to the storage chamber 27. During conditions A and B the percentage of carbon dioxide under each condition is different. However, the atmospheres blend in chamber 27 to provide an over-all relatively constant atmosphere. During these cycles the products of combustion are fed through the adsorber bed 26 in condition A to strip carbon dioxide from the combustion products atmosphere. Then the bed is regenerated, purged of air, which contains oxygen, and then returned to the beginning of condition A. During these repeating cycles the burner continues to burn, the ignition circuit is not used again, the power relay 98 is not used again and the delay relay 84 is not used again.

Under some storage conditions in storage chamber 27, such as those conditions requiring extremely low concentrations of carbon dioxide, condition B may be altered as will now be described. This altered condition, here identified as condition B', is obtained by modifying some of the connections as shown in FIGURE 14. Here, timer switch 127 is shown as a double-pole switch having two terminals 127a and 127b. To achieve condition B', wire 125 is disconnected from the top of solenoid 126 and a new wire 125a connects the top of solenoid 126 to other terminal 127a of timer switch 127. All other wiring connections remain unchanged. Thus, when the power relay 98 is de-energized and timer switch 128 is preset to be closed at this instant as has been described, solenoid 126 of valve 51 is now energized by way of timer switch 128, wire 125, timer switch 127 through terminal 127a, wire 125a', and solenoid 126 to line 80. Condition A will therefore remain unchanged. However, after the 21 minutes of condition A, timer switch 127 now moves from terminal 127a to terminal 127b, thereby energizing solenoids 124, 119, 120 and 121 of valves 55, 49, 44 and 47, respectively, but this action de-energizes solenoid 126 of valve 51. This provides the altered condition B'.

Under condition B', the products of combustion now pass through the pipe 24, pipe 43, energized valve 49, pipe 50 and de-energized valve 51 to the pipe 53 and out the purge outlet pipe 45. Of course, during this altered condition B', heated air passes through the adsorber bed 26 and out the purge outlet pipe 45 in the same manner as in condition B. It has been determined that this altered condition B' also lasts approximately 3 minutes.

Other storage conditions require an atmosphere within storage chamber 27 comprising a relatively low percentage of carbon dioxide and a relatively higher percentage of oxygen. This is achieved electrically by connecting wire 125a from solenoid 126 to terminal 127a of timer switch 127 and by shorting timer switch 128 with a jumper wire 128a, as shown dotted in FIGURE 14. These connections establish that the previously described conditions A and B' remain unchanged, but condition C is now altered (condition C') to provide that solenoid 126 of valve 51 becomes re-energized by timer switch 127 returning to terminal 127a at or near the start of this time period for condition C'. This permits the products of combustion to pass from pipe 24 through pipe 43, valve 44, pipe 46, the adsorber bed 26, valve 47, pipe 48, valve 49, pipe 50, now energized valve 51 and pipe 52 to storage chamber 27 during the purge operation, which substantially increases the amount of oxygen directed to the storage chamber 27.

Yet other storage conditions require an atmosphere within storage chamber 27 comprising a relatively high percentage of carbon dioxide and a relatively high percentage of oxygen. This is achieved electrically by connecting solenoid 126 of valve 51 as shown in FIGURE 2, and by shorting timer switch 128 with jumper wire 128a as shown in FIGURE 14. Here, conditions A and B are unchanged, and condition C' now exists in which the products of combustion pass through adsorber bed 26 to purge the adsorber and then are passed to the storage room.

The system as illustrated in FIGURES 1 and 2 contains a number of safety features to protect the system and to protect the products stored within the chamber 27. Thus, if the water supplied at pipe 57 should fail or if the water should be too warm the water condenser thermostat 62 opens (at, for example, 135° F.) to shut off the apparatus. This is a manually reset switch requiring the operator to manually close it to re-initiate the cycle. If the water leaving the burner 20 as sensed by the water control thermostat 72 is too hot (for example, above 135° F.) the water control thermostat 72 opens also shutting off the apparatus. This condition could exist if the incoming water supply failed or if the water was too hot, and it also could exist if any blockage occurred in the various water passages associated with the condenser, burner and air heater. This also is a manually reset switch again requiring manual closing by the operator. If the air pressure in the system and especially in the air-gas regulator 31 is excessive (for example, above 4.5 inches of water) the safety switch 42 will open also shutting down the apparatus. This again must be manually reset by the operator.

If for some reason air pressure in the system supplied by the blower 21 falls below a minimum value (for example 3.3 inches of water) air switch 41 opens shutting off the power to the gas solenoid valves 29 and 30 but permitting the blower motor 97 to continue to run.

When air switch 41 opens, it also interrupts the circuit to de-energize solenoids 119, 120, 121, 124 and 126 and valves 44, 47, 49, 51 and 55. The products of combustion may now contain undesirable elements and are exhausted through pipes 24 and 43, valve 44, pipe 46, adsorber chamber 25, valve 47, pipe 48, valve 49, pipe 50, valve 51 and pipe 53 to pipe 45. With the gas supply shut off and the blower still operating, the burner will rapidly cool and switch 104 of inlet sensor 77 will move from hot terminal 106 to cold terminal 103. This opens the circuit to signal light 108, extinguishing it, giving the visual indication that burner 20 is not operating.

When switch 104 engages cold terminal 103, operating coil 99 of power relay 98 is energized to operate switches 100 and 101 and, as hereinbefore described, energize solenoids 119, 120 and 121, valves 44, 47 and 49 causes the air flowing through the burner to bypass adsorber chamber 25 and flow to the pipe 45.

Similarly, if the incoming gas pressure entering through the gas line 22 should fall below a minimum value (such as about 5.5 inches in water) gas switch 28 opens shutting off the power to gas solenoid valves 29 and 30. Thus, the gas supply to the burner is shut off and, with the fan still operating, the burner will rapidly cool to operate inlet sensor 77 which, as above described, causes lamp 108 to become extinguished giving the visual indication the burner is not operating and the air flowing through the burner is directed past the adsorber chamber 25 to pipe 45.

If the flashback sensor 76 senses an overly heated condition (for example, above 800° F.) which could be caused by poor combustion or flashing back of flame into the air-gas mixing line 36, this switch will open also shutting off the power to gas solenoid valves 29 and 30. Again, this shuts off the gas supply to the burner and, as above described, the visual indication is obtained and the air passing through the burner is exhausted.

If for any reason the inlet sensor thermostat 77 senses a burner temperature at the inlet below a predetermined value (for example, below about 700° F.) switch 104 of the inlet sensor would move to the cold terminal 103 so, as above described, the products of combustion which now may be faulty would pass directly to the purge outlet 45.

The above description of the apparatus and its operation is of the system as a whole. This system is claimed specifically in the copending application of James W. Lannert et al. Serial No. 213,398, filed July 30, 1962, and assigned to a common assignee.

A preferred catalytic burner and assembly of catalytic burner and condenser are disclosed in FIGURES 3–13 inclusive. This construction is claimed specifically in the copending application of Rolf I. Ranum Serial No. 213,397, filed July 30, 1962, and assigned to a common assignee.

A side elevation of the preferred catalytic burner 130 and preferred condenser 131 assembly and certain associated structure is shown in FIGURE 3. When used in the system of FIGURES 1 and 2, the preferred burner 130 is assembled into the system in the same manner as the burner 20 illustrated in FIGURE 1. Similarly, the condenser 131 is assembled like the condenser 23 of FIGURE 1 and both the preferred burner and preferred condenser operate in the manner previously described as to burner 20 and condenser 23.

Burner 130 comprises an enclosing generally rectangular frame 132 of box-like construction closed by top closure member 133 and bottom closure member 134. These closure members are the preferred forms of the closure members 63 and 67, respectively, of the first embodiment shown in FIGURE 1.

The specific structure of each closure member 133 and 134 is substantially identical. As shown in FIGURES 12 and 13, the top closure member 133 is made up of a flat metal plate 135 and a metal plate 136 provided with a serpentine passage 136' extending back and forth lengthwise across the width of the plate to provide a passage for a coolant such as cooling water. The entrance to the top closure member 133 is provided with a short pipe 137 to which is attached a fitting 138, see FIGURE 3. The exit from the serpentine passage 136' is provided with a pipe 139 to which is attached a fitting 140.

One side of the frame 132 has attached thereto adjacent the top an inlet manifold 141 for the gaseous fuel and air mixture. This inlet manifold 141 is provided with a bushing 142 to which is attached the air-gas line 36 as illustrated in FIGURE 1. This inlet manifold and bushing also contains the flashback sensor 76 having its feeler end extending to within the frame 132 as illustrated in FIGURE 3.

The opposite side of the frame 132 adjacent the bottom thereof is provided with an outlet manifold 143. Extending downwardly from the outlet manifold is the condenser 131 through which pass the products of combustion from the burner 130. The condenser 131 is cooled by water flowing through the back and forth passes of water tubes 144 which function similarly to the water tubes 60 of FIGURE 1. The bottom water tubes 144 are connected by means of a T to an extending inlet pipe 145. The topmost section of water tubes 144 is connected to an outlet fitting 146 and an outlet pipe 147. The condenser 131 is also provided with reinforcing fins 148, and with a drain outlet 154 which connects to a trap such as 73 of FIGURE 1.

The bottom closure member 134, which is like the top closure 133 shown in detail in FIGURES 12 and 13, is also provided with an inlet fitting 149 at one side and an outlet fitting 150 at the other side.

When connected into the entire system in the manner illustrated by the burner 20 and condenser 23 of FIGURE 1 inlet fitting 138 is connected by a pipe (not shown) to the outlet fitting 146 of the condenser 131. The outlet fitting 140 of the top closure member 133 may be connected by a pipe similar to pipe 64 (FIGURE 1) to air heater 65. The outlet thereof is connected by a pipe similar to pipe 66 (FIGURE 1) to the inlet fitting 149 of the bottom member 134. The outlet fitting 150 of the bottom member 134 is connected to one end of a water pipe 151 through which water flows in the direction indicated by the arrow 152. The end of the pipe 151 opposite the fitting 150 is itself provided with a fitting 153 which is adapted to be connected to an outlet pipe (not shown) which connects to a drain similar to the drain pipe 70. The water pipe 151 is adapted to contain the water control thermostat 72 illustrated diagrammatically in FIGURES 1 and 2. Thus, with this arrangement cooling water flows into the condenser through pipe 145, through cooling pipes 144 in the condenser, through the outlet 146 from the condenser, into the inlet 138 and the top closure member 133, through the passages 136' in this top member to the outlet 140, from the outlet 140 to an air heater such as air heater 65 (FIGURE 1), to the bottom inlet 149, through the cooling passages in the bottom closure member 134, from the outlet 150 in the bottom closure member 134 through the pipe 151 and from the fitting 153 to the drain.

One side of the frame 132 adjacent the bottom thereof is provided with a spark plug 75. The opposite side of the frame near the bottom thereof is provided with the second spark plug 75 in about the same relative position to the frame as the spark plug 75 illustrated in FIGURE 3. The burner 130 is provided with mounting brackets 155 and with a pair of openings on each side sealed by pipe plugs 156.

The bottom of the condenser 131 is provided with an outlet bushing 157 for the products of combustion that is adapted to be connected to a pipe outlet similar to the pipe 24 of FIGURE 1.

For clarity of illustration, FIGURE 4 is a plan view of the burner 130 partially broken away and with the top closure member 133 removed in order to show the support for the bed 158 (FIGURE 9) of finely divided catalyst. This support comprises a flat foraminous member 159, here shown as a wire screen, of 10 by 10 mesh, .025 inch diameter "Inconel" wire. The screen 159 is shown in detail in FIGURES 10 and 11 and as shown is provided with spaced parallel embossments 160 extending lengthwise of the screen 159 and extending in cross section slightly more than 180°. These spaced parallel embossments serve to strengthen the screen.

As shown in enlarged detail in FIGURE 9 and in FIGURE 6, the edges of the screen 159 are held between upper and lower spaced flanges 161 and 162 mounted on the inner surface of the frame 132. The screen 159 is not clamped by the flanges 161 and 162 but is free to move relative thereto particularly under the expansion and contraction due to heating and cooling.

The bed 158 of catalyst is illustrated only fragmentarily in FIGURE 9 for illustrative purposes only.

The bed 158 of catalyst and the supporting screen 159 are supported on a plurality of transverse rods 163 here shown as 11 and including a center rod 164. As can be seen in FIGURE 4, the rods extend across the shorter width of the frame 132. Each of the rods 163 except for the center rod 164 is supported loosely by means of a plurality of brackets 165 fastened at the side of the frame 132 on the angle 166 whose top part forms the supporting flange 162. As is shown in FIGURE 7, the bottom 167 of each bracket 165 is substantially horizontal so that the rods 163 can move relative to the bracket under the forces of expansion and contraction. At the same time each rod 163 and 164 can also expand and contract longitudinally because of the free ends as illustrated in FIGURE 9. As is shown in FIGURES 4 and 6, the brackets 165 on either side of the center rod 164 face away from this center rod and to the opposite side of the burner. As is illustrated in FIGURE 8, the center rod 164 is not mounted in this manner but is mounted at the ends by a pair of partially encircling brackets 168 which limit lateral movement of the rod but still permit the usual longitudinal movement under the forces of expansion and contraction.

As illustrated in FIGURE 9, the screen 159 is loosely tied to the rods 163 and 164 by means of loose wire ties 169. Also, as illustrated in FIGURE 9, the outlet manifold 143 is provided with a plurality of openings 170 through which products of combustion from the space 171 beneath the catalyst bed 158 may flow to the condenser 131. Also located in this space 171 is a pair of openings 172 of which one is illustrated in FIGURE 9 for retaining the spark plugs 75.

The products of combustion from the bottom space 171 flow through a series of horizontally aligned openings 173 in the frame 132 beneath the screen 159 and bed 158. The relationship of these openings 173 is shown in phantom in FIGURE 6.

The air-gas mixture is conveyed from the inlet manifold 141 into the upper space 174 in the burner above the catalyst bed 158 by a plurality of horizontally aligned openings 175 that are located immediately above this bed. To aid in distributing the air-gas mixture uniformly over the cataylst bed, there may be a plurality of baffles 178 fastened to top closure member 133, as shown in FIGURE 3.

As is shown in FIGURES 5 and 9, the frame 132 is provided with upper and lower reinforced edge flanges 176 and 177 to which are bolted the edges of the top and bottom closure members 133 and 134.

As is disclosed in the above-mentioned copending application 149,731, the catalyst for the bed 158 is a well known and commercially available material. The typical catalysts are chrome-alumina and platinum-alumina and are supplied primarily to the petroleum industry for hydrocarbon modification.

In operating the system described herein, the relative amounts of air and gas are regulated so as to produce approximately from 2–10% oxygen, preferably, in the combustion products. During the operation of the system combustion is initiated in the lower space 171 by means of the spark plugs 75. However, burning rapidly moves upwardly through the screen 159 to take place in the catalyst bed 158. If burning moves out of the catalyst bed it is detected by the flashback sensor 76 in the manner previously described. A typical catalyst is a chrome-alumina catalyst containing about 20% chromic oxide and is in the form of about one-eighth inch extruded pellets. The burner is preferably operated at a temperature of about 1600° F. maximum and the temperature within the burner is kept beneath about 2000° F. primarily by the cooling water, as previously described, in order to prevent the production of substantial amounts of the oxides of nitrogen. The minimum temperature at the center of the catalyst bed must be about 1200° F. for complete combustion.

In operating the system it sometimes occurs that the products of combustion are in the desired proportions of oxygen, carbon dioxide and inert gases for preserving the food products. When this occurs the combustion products are not passed through the adsorber bed 26 but are passed directly into the storage chamber 27 in the manner specified above. In the usual preserving of food products the storage chamber 27 is chilled to between about 29–55° F. However, as the apparatus for chilling the chamber 27 forms no part of the present invention it is not illustrated.

In the invention claimed herein, the nature of the atmosphere is controlled by removing, when desired, carbon dioxide from mixed gases before conveying these mixed gases to a receiver such as the storage chamber 27. The mixed gases are initially supplied from a source which here is the catalytic burner 20 and these mixed gases are passed through a retaining means for releasably retaining carbon dioxide, here exemplified by the adsorber bed 26. The carbon dioxide is removed from the retaining means when desired by fluid regenerating means which is air from the blower 21, heated as needed to prevent condensation of moisture. The apparatus includes means for passing mixed gases through the retaining means into the receiver for a desired time and means for passing the mixed gases from the source in the manner described above directly into the receiver for a further desired time. Then, means are provided for substantially simultaneously during this further time passing the fluid regenerating means or heated air through the retaining means or adsorber bed 26 to remove carbon dioxide therefrom. As is described above, the apparatus may include alternate means for passing the mixed gases from the source to the atmosphere rather than into the receiver for the further desired time.

The means for directing the various fluids in the above-described manner includes a first conduit identified herein as 24 from the source of the mixed gases, a second conduit here identified as 35 from the air source or blower 21, a third conduit here exemplified by the pipe 52 to the receiver or storage chamber 27, first valve means here exemplified by the valves 44, 47, 49 and 51 for directing gas from the conduit 24 through the adsorber bed 26 to this third conduit 52 for a first time interval, and second valve means here exemplified by the valves 44, 49 and 51 for directing gas from the first conduit 24 directly to the third conduit 52 by way of the conduit 50 for a second time interval. Alternately, the apparatus may include second valve means exemplified by the valves 44, 49 and 51 for directing the gas from the first conduit 24 to by-pass the adsorber bed 26 and pass to a destination exemplified by pipe 45 for said second time interval. The apparatus also includes third valve means including the valves 55, 47 and 44 for directing air from the second conduit 35 through the adsorber bed 26 during this second time interval and fourth valve means exemplified by the valves 44, 47, 49 and 51 for directing gas from the first conduit 24 through the adsorber bed to a destination exemplified by the pipe 45 for a third time interval.

In one example of controlling the nature of the atmosphere gas from a source such as the exemplified burner may contain 11% carbon dioxide, 2% oxygen, both by volume, and the balance nitrogen and other inert gases from air. Under certain storage conditions for storing certain types of products the preferred gas content may be 2% carbon dioxide, 3% oxygen and the balance nitrogen and other inert gases. This invention provides an apparatus for reducing the carbon dioxide content from 11% to the desired 2%. In the apparatus of this invention, as previously described, a gas containing substantially no carbon dioxide is passed into a storage room for approximately 21 minutes in the exemplary procedure given. Then, for approximately 3 minutes a gas containing about 11% carbon dioxide is passed into the storage chamber or room. Finally, for about 3 minutes there is no incoming gas to the storage chamber. The result of this combination of conditions plus a normal small amount of oxygen that has been found to leak naturally into the chamber from the surrounding atmosphere results in a storage atmosphere in the chamber averaging approximately 2% carbon dioxide and 3% oxygen with the rest being inert gases including nitrogen from air.

In another example, a gas containing substantially no carbon dioxide is passed into the storage room for approximately 21 minutes, and then, for a total of approximately 6 minutes no gases are passed into the storage room from the apparatus. The result of this combination of conditions, including the small leakage into the chamber, is a storage atmosphere in the chamber averaging approximately between 0 and 1% carbon dioxide and 3% oxygen with the rest being inert gases including nitrogen from the air.

As is apparent, this same apparatus can be used to produce an atmosphere comprising substantially any carbon dioxide content less than approximately 15% and any oxygen content under 21% by changing the conditions, although the carbon dioxide and oxygen contents are interrelated.

The adsorber bed of finely divided activated carbon is operated at approximately ambient temperatures. The principal requirement is that the bed be at a temperature higher than the dew point of the incoming gas in order to prevent condensation of moisture in the bed. In a typical installation about 250 pounds of activated carbon were used, the incoming mixed gases from the burner and condenser were at approximately 50° F. and saturated, and the incoming heated air for regeneration was approximately 80° F. The gas flowing from the bed into the storage chamber is a little above about 50° F. The gas flow through the bed into the storage chamber under condition A in this typical installation is approximately 20 cubic feet per minute. During the regeneration cycle the air flow from the heated air source through the bed is approximately 200 cubic feet per minute.

Having described our invention as related to the embodiments shown in the accompanying drawings, it is our intention that the invention be not limited by any of the details of description, unless otherwise specified, but rather be construed broadly within its spirit and scope as set out in the accompanying claims.

We claim:

1. Apparatus for controlling the carbon dioxide content of a mixture of gases, comprising: means providing a source of gas containing carbon dioxide; retaining means for releasably retaining carbon dioxide; means for periodically directing said gas from said source through said retaining means for supplying low carbon dioxide gases to said mixture; means providing a source of regenerating fluid for effecting the removal of carbon dioxide from said retaining means; and means for directing said regenerating fluid from its source through said retaining means for effecting the removal of carbon dioxide therefrom.

2. Apparatus for controlling the carbon dioxide content of a mixture of gases, comprising: means providing a source of gas containing carbon dioxide; retaining means for releasably retaining carbon dioxide; low carbon dioxide gas conduit means operatively associated with said retaining means for conveying said gas from said source through said retaining means for supplying low carbon dioxide gases to said mixture; conduit means for bypassing said retaining means with said gas from said source for supplying said gas directly to said mixture; means providing a source of regenerating fluid for effecting the removal of carbon dioxide from said retaining means; and regenerating fluid conduit means operatively associated with said retaining means for flowing regenerating fluid from its source through said retaining means.

3. Apparatus for controlling the carbon dioxide content of a mixture of gases, comprising: means providing a source of gas containing carbon dioxide; retaining means for releasably retaining carbon dioxide; low carbon dioxide gas conduit means operatively associated with said retaining means for conveying said gas from said source through said retaining means for supplying low carbon dioxide gases to said mixture; bypass conduit means for bypassing said retaining means with said gas from said source for supplying said gas directly to said mixture; means for passing said gas from said source through said low carbon dioxide gas conduit means for a desired time; means for passing said gas from said source through said bypass conduit means for a further desired time; means providing a source of regenerating fluid for effecting the removal of carbon dioxide from said retaining means; means for substantially simultaneously during said further time passing said regenerating fluid from its source through said retaining means for removing carbon dioxide therefrom; and means for passing said gas containing carbon dioxide through said retaining means subsequent to said further time for removing said regenerating fluid from said retaining means.

4. Apparatus for controlling the carbon dioxide content of a mixture of gases, comprising: means providing a source of gas containing carbon dioxide; retaining means for releasably retaining carbon dioxide; gas outlet means operatively associated with said retaining means and located exteriorly thereof; low carbon dioxide gas conduit means operatively associated with said retaining means for conveying said gas from said source through said retaining means for supplying low carbon dioxide gases to said mixture; means for passing said gas from said source through said low carbon dioxide gas conduit means for a desired time; bypass conduit means for bypassing said retaining means with said gas from said source for supplying said gas directly to said mixture; means providing a source of regenerating fluid for effecting the removal of carbon dioxide from said retaining means; means for passing said regenerating fluid through said retaining means for removing carbon dioxide therefrom; and means for thereupon passing said gas containing carbon dioxide through said retaining means for removing said regenerating fluid from said retaining means.

5. Apparatus for controlling the carbon dioxide content of a mixture of gases, comprising: means providing a source of gas containing carbon dioxide; an adsorber for releasably retaining carbon dioxide having an entrance and an exit; bypass conduit means for bypassing said adsorber with said gas from said source for supplying said gas directly to said mixture; low carbon dioxide gas conduit means operatively associated with said adsorber for conveying said gas from said source through said adsorber for supplying low carbon dioxide gases to said mixture; first valve means for directing said gas from said source through said low carbon dioxide conduit means for a first time interval; second valve means for directing said gas from said source through said bypass conduit means for a second time interval; an air conduit operatively associated with said adsorber; and third valve means for directing air from said air conduit through said adsorber for removing carbon dioxide therefrom.

6. Apparatus for controlling the carbon dioxide content of a mixture of gases, comprising: means providing a source of gas containing carbon dioxide; an adsorber for releasably retaining carbon dioxide having an entrance and an exit; bypass conduit means for bypassing said adsorber with said gas from said source for supplying said gas directly to said mixture; low carbon dioxide gas conduit means operatively associated with said adsorber for conveying said gas from said source through said adsorber for supplying low carbon dioxide gases to said mixture; first valve means for directing said gas from said source through said low carbon dioxide conduit means for a first time interval; second valve means for directing said gas from said source through said bypass conduit means for a second time interval; an air conduit operatively associated with said adsorber; third valve means for directing air from said air conduit through said adsorber during said second time interval for removing carbon dioxide from said adsorber; and fourth valve means for thereupon directing said gas containing carbon dioxide through said adsorber for a third time interval for removing air from said adsorber.

References Cited by the Examiner

UNITED STATES PATENTS

| | | | |
|---|---|---|---|
| 1,952,005 | 3/34 | Willenborg | 23—281 |
| 2,434,353 | 1/48 | Edwards | 137—624.18 X |
| 2,768,058 | 10/56 | Hotchkiss | 23—281 X |
| 3,100,685 | 8/63 | Duffey | 23—2.1 X |
| 3,102,778 | 9/63 | Bedrosian et al. | 21—58 |

FOREIGN PATENTS 520,912   1/56   Canada.

OTHER REFERENCES

Hassler: Active Carbon, pp. 279—280 (1951), Chemical Publ. Co., Inc., Brooklyn, N.Y.

MORRIS O. WOLK, *Primary Examiner.*